Figure 1:
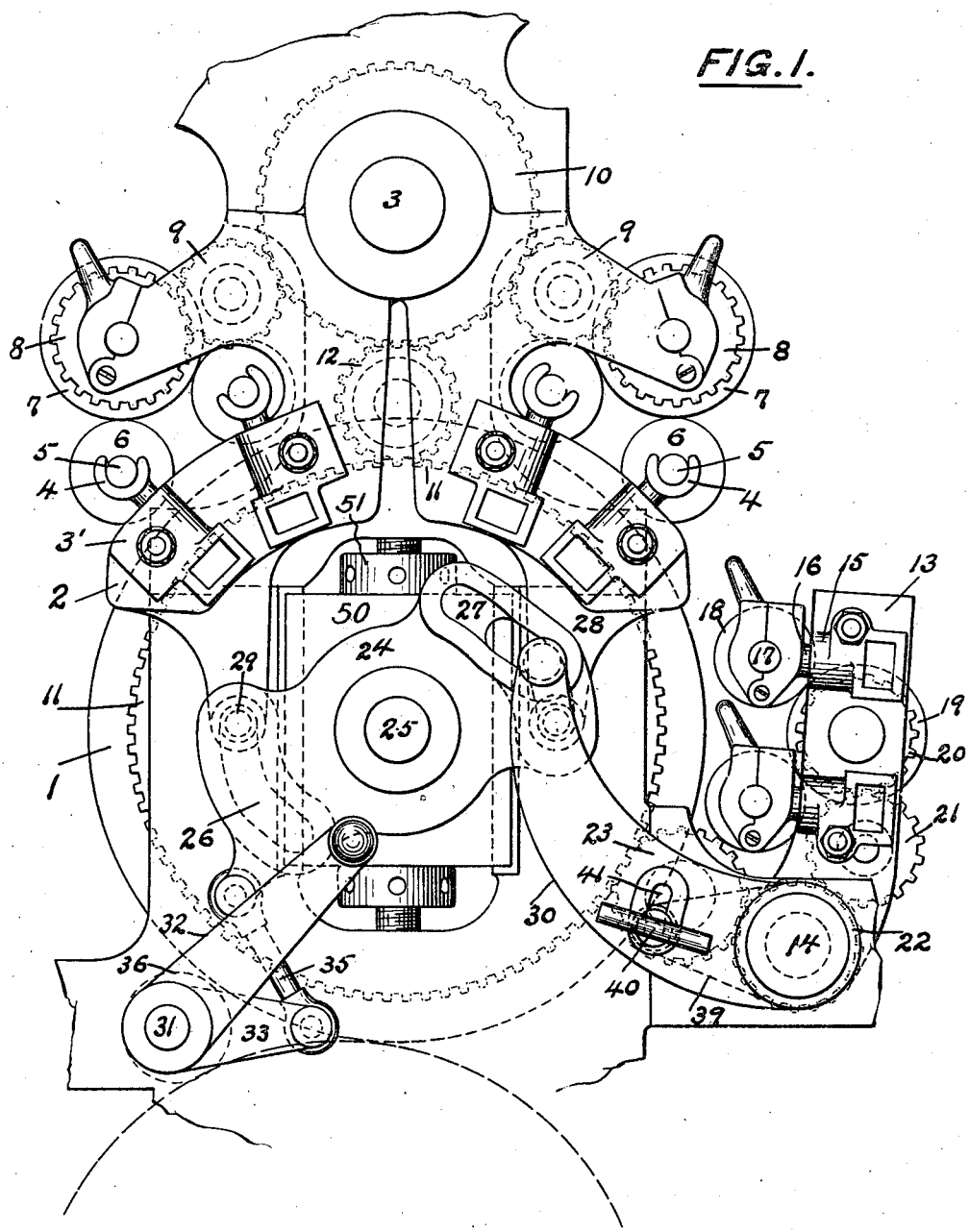

W. J. MAIN.
CONTROLLING DEVICE FOR INKING AND DAMPING MECHANISMS.
APPLICATION FILED JAN. 7, 1909.

999,510.

Patented Aug. 1, 1911.

WITNESSES.

INVENTOR.

W. J. MAIN.
CONTROLLING DEVICE FOR INKING AND DAMPING MECHANISMS.
APPLICATION FILED JAN. 7, 1909.

999,510.

Patented Aug. 1, 1911.

4 SHEETS—SHEET 3.

WITNESSES.
A. White
John J. Kearns

INVENTOR.
William J. Main
by Philipp Sawyer, Rice & Kennedy
Attys

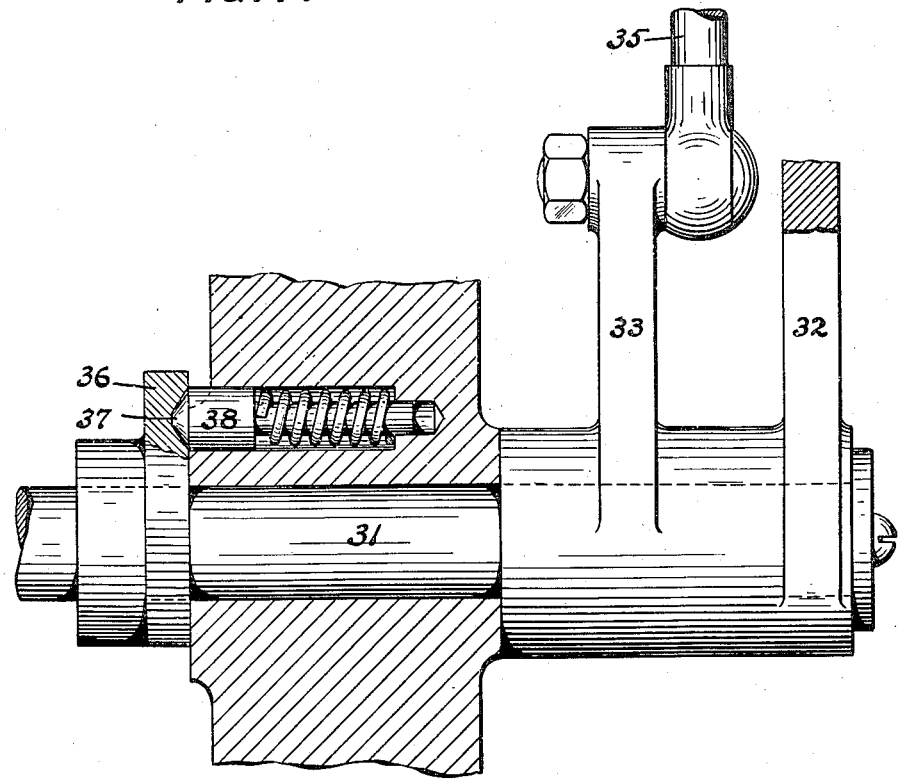

UNITED STATES PATENT OFFICE.

WILLIAM J. MAIN, OF WESTPORT, CONNECTICUT, ASSIGNOR, BY MESNE ASSIGNMENTS, TO R. HOE AND CO., OF NEW YORK, N. Y., A CORPORATION OF NEW YORK.

CONTROLLING DEVICE FOR INKING AND DAMPING MECHANISMS.

999,510. Specification of Letters Patent. Patented Aug. 1, 1911.

Application filed January 7, 1909. Serial No. 471,097.

*To all whom it may concern:*

Be it known that I, WILLIAM J. MAIN, a citizen of the United States, residing at Westport, county of Fairfield, and State of Connecticut, have invented certain new and useful Improvements in Controlling Devices for Inking and Damping Mechanisms, fully described and represented in the following specification and the accompanying drawings, forming a part of the same.

This invention relates to certain improvements in devices for operating inking and damping mechanisms.

In printing machines provided with planographic printing surfaces, it is necessary at times to separate the printing surface and the inking and damping mechanisms, and, in order that the inking mechanism shall not come in contact with the plate at any time when the plate is not suitably damped, it is desirable that the construction shall be such that the damping mechanism shall surely have dampened the surface before the inking mechanism comes into contact with it. To insure these conditions, it is desirable, when the surface and inking and damping mechanism are separated and brought together, that the inking mechanism move out of contact with the printing surface ahead of the damping mechanism and that the damping mechanism move into contact with the printing surface ahead of the inking mechanism.

This invention has for its object to produce an improved mechanism for controlling the movement of the inking and damping mechanisms of machines provided with planographic printing surfaces, the improved mechanism being of such a character that the damping mechanism moves into contact with the surface before the inking mechanism and out of contact therewith after the inking mechanism is out of contact.

A further object of the invention is to produce an improved mechanism for printing machines provided with planographic surfaces in which the inking mechanism shall be moved out of contact with the surface before the damping mechanism and the damping mechanism be moved out of contact with the surface after the inking mechanism moves out, the mechanism further including means by which the damping mechanism may be held in contact with the printing surface and the inking mechanism out of contact therewith.

With these and other objects not specifically referred to in view, the invention consists in certain constructions and in certain parts, improvements and combinations as will be hereinafter fully described and then specifically pointed out.

Figure 2:
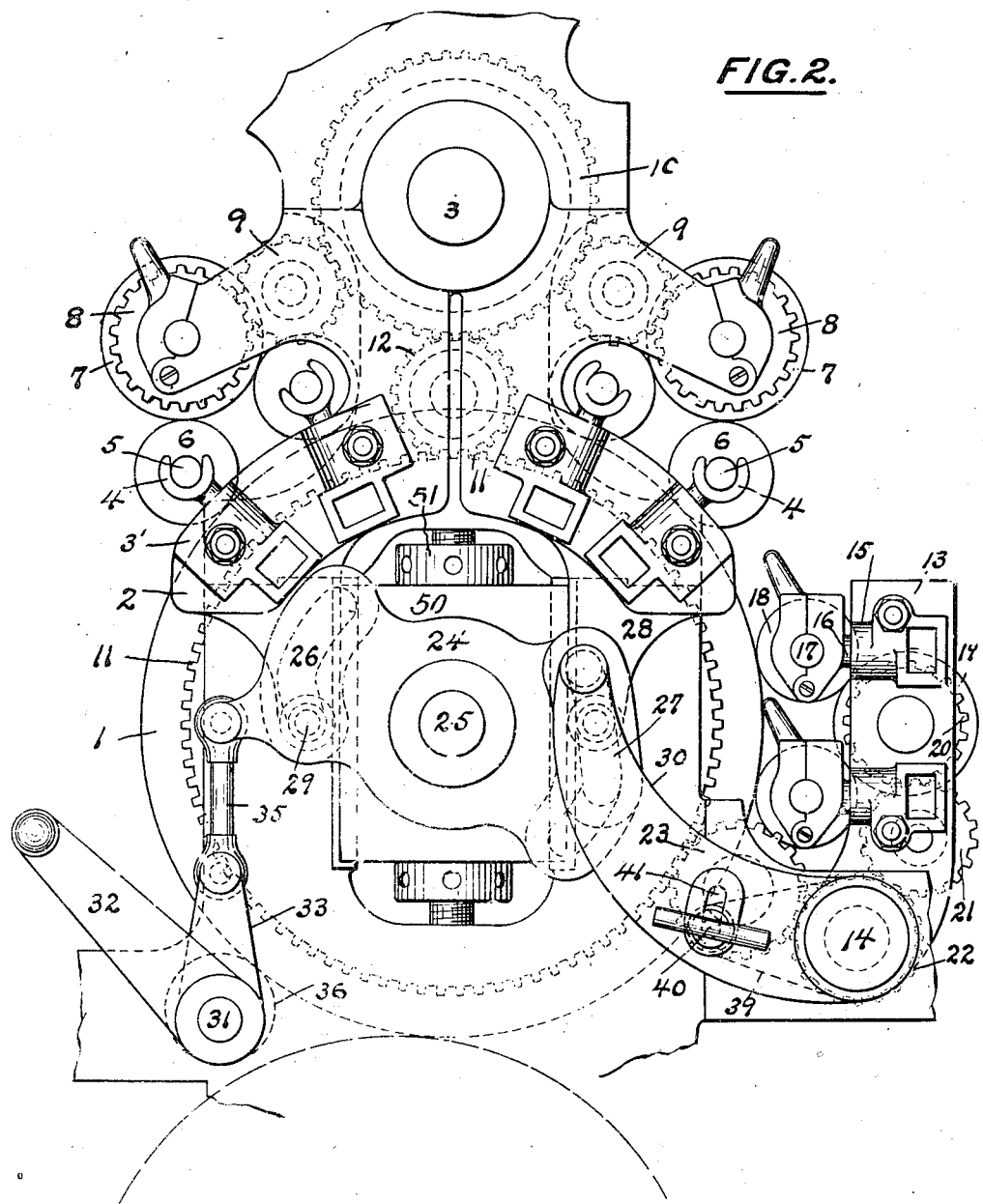
Figure 3:
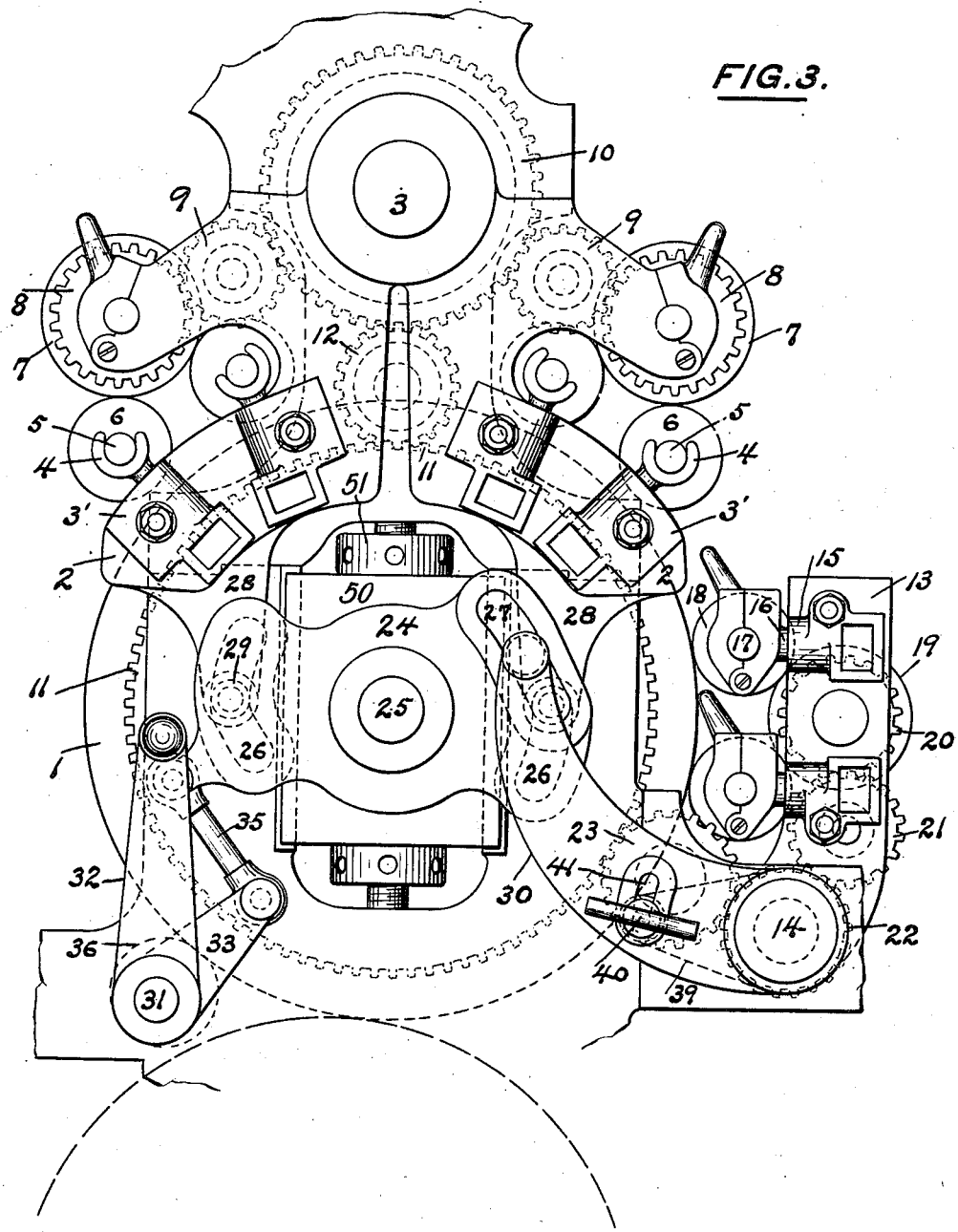

Referring to the accompanying drawings,—Figure 1 illustrates one embodiment of the invention, the parts being shown in the position they occupy when both the inking and damping mechanisms are out of contact with the printing surface. Fig. 2 illustrates the construction shown in Fig. 1, but with the parts in the position they occupy when the inking and damping mechanisms are in contact with the printing surface. Fig. 3 illustrates the same construction as that shown in Figs. 1 and 2, but shows some of the parts in an intermediate position and with the damping mechanism alone in contact with the printing surface. Fig. 4 is a detail view illustrating certain locking mechanism which may be employed.

Referring to the drawings which illustrate one embodiment of the invention, 1 indicates a printing cylinder which is provided with a planographic surface, such, for instance, as an aluminum or zinc plate. Suitable inking mechanism will be provided for inking the printing surface, which mechanism may be varied in its construction and in the manner of mounting the same. In the particular construction illustrated, there is provided a pair of brackets 2, these brackets being pivoted on a shaft 3, this shaft, in the construction shown, being the shaft of one of the distributing rolls. These brackets 2 are provided with socket holders 3' and in these socket holders are mounted sockets 4 which support the journals 5 of the form rollers 6. These form rollers, in the particular construction illustrated, derive their ink from rolls 7 provided with gears 8, these gears meshing with gears 9 which in turn mesh with a gear 10 on the roll supported on the shaft 3. Intermediate rolls, not shown, transfer the ink from the roll to the rolls 7, the construction being a usual one. The gear 10, in the particular construction illustrated, is driven from a gear 11 on the printing cylinder, this gear driving an intermediate 12.

The damping mechanism employed may be varied widely both in its construction and in its mode of mounting. In the particular construction shown, there is provided a bracket 13 mounted on a shaft 14 suitably supported in the frame. This bracket is provided with socket holders 15 which carry sockets 16 in which the shafts 17 of the damping rolls 18 are mounted. The damping rolls, in the particular construction illustrated, derive their moisture from a roll 19 which in turn receives it from a fountain, not shown. The shaft of this roll 19 is provided with a gear 20 which meshes with an intermediate 21, this intermediate in turn meshing with a gear 22 loose on the shaft 14. This loose gear is driven from the gear 11 by means of an intermediate 23.

The movements of the inking and damping mechanisms into and out of contact with the cylinder are produced through the agency of a controller which is so constructed as to move the inking rolls out of contact with the cylinder ahead of the damping rolls and the damping rolls into contact with the cylinder ahead of the inking rolls. The particular construction of this controller may be varied. As shown, it includes a plate 24 mounted on the shaft 25 of the cylinder 1, this plate being provided with cam surfaces for effecting the movements referred to of the inking and damping mechanisms. While these cam surfaces may be variously arranged, as shown, the plate 24 has on its rear side, or side next the frame, cam grooves 26 and on its front side a cam groove 27, these grooves being formed in bosses cast on the plate. The connections between the cam surfaces referred to and the inking and damping mechanisms may be varied, but as shown, the inking mechanism brackets are provided with extensions 28, these extensions having rolls or studs 29 thereon which engage the cam grooves 26. The means by which its cam surface moves the damping mechanism may be also varied. As shown, the shaft 14 on which the bracket 13 is fast is provided with an arm 30, this arm carrying a cam roll or stud which engages in the cam groove 27 before referred to.
Referring to Fig. 1, it will be seen that as the controller plate 24 starts to move, the cam rolls on the extension 28 of the inking roll brackets will travel in a part of the grooves 26 which is concentric with the center of the printing roll shaft 25, so that there will be no movement of the inking roll brackets, but during this part of the movement of the plate, the roll on the arm 30 travels in a part of the cam groove 27 which is eccentric with the center of the shaft, so that this part of the movement of the controller plate rocks the shaft 14 and brings the damping rolls into contact with the surface of the cylinder. During the further movement of the plate, the roll on the arm 30 travels in a part of the groove 27 which is concentric with the shaft so that there is no further movement of the damping rolls, but the rolls on the extensions 28 now travel in parts of the grooves 26 eccentric with the shaft 25 so that the brackets 2 are swung and the inking rolls brought into position to ink the surface of the cylinder. When the inking and damping mechanisms are to move out of contact with the cylinder, the same operations take place but in reverse order.

It will be observed that the movement of the inking and damping mechanisms takes place independently of any movement of the cylinder. In other words, when the inking and damping mechanisms are moved either into or out of position the cylinder 1 remains stationary, that is to say, it is relatively stationary with respect to the movement of the inking and damping mechanisms which results from the operation of the controller.

The means for moving the controller plate may be considerably varied, but in constructions embodying the invention in its best form, the means will be such as to lock the controller plate with the inking and damping mechanisms in their in or out position. As shown, there is provided a rock-shaft 31 which may be conveniently provided with a handle 32 by which it is operated. This rock shaft has on it a crank arm 33 which arm is connected with the controller plate 24 by a link 35, the arrangement of the link and crank arm being such that when the rolls reach their in position the link passes into line with the crank arm which at that time is in vertical position. The rolls are, therefore, thus locked in their in position, since the weight of the parts has no tendency to throw the arm and link out of their straight line position and thus rock the shaft. When the rolls reach their out position, see Fig. 1, the studs on the extensions 28 and on the arm 30 are lying in the concentric part of the cam grooves in the controller plate. The weight of the parts, therefore, tends to move the studs inward on substantially radial lines toward the center on which the controller plate rocks. The weight of the parts, therefore, has no tendency to move the controller plate so that the rolls are locked in their out position.

It is frequently desirable to run the press with the water rolls alone in contact with the printing surface, so that a thorough damping of this surface is insured before it comes in contact with the inking rolls. In the construction shown, this may be accomplished by swinging the rock-shaft 31 so that the crank 32 will occupy a position intermediate those which it occupies in the in and out positions of the rolls, this position being illustrated in Fig. 3. Means may be provided for locking the controller plate with the rolls in the position referred to, that is, with the damping rolls in contact with the printing surface and the inking rolls out of contact. While the means may be varied, it may be conveniently accomplished by providing the shaft 31 with a collar 36 having a notch 37, this notch being arranged to come opposite the head of a spring bolt 38 located in a socket in the machine frame. Means may be also provided for effecting the movement of the water rolls independently of the controller. While this may be accomplished in various ways, in the construction shown, the shaft 14 is provided with an arm 39 this arm carrying a T-bolt 40 which extends through a slot 41 in the arm 30 before referred to. By loosening this T-bolt the shaft 14 may be rocked independently of the movement of the arm 30.

It will be observed that the printing cylinder shaft 25 is mounted in sliding boxes 50, these boxes being adjustable by set screws 51 tapped into the frame in the usual manner. The cylinder is, however, relatively stationary with respect to the inking and damping mechanisms, that is to say, it has no movement during the time these mechanisms are moved into and out of position.

Changes and variations may be made in the construction by which the invention is carried into effect. The invention is not, therefore, to be confined to the particular construction herein shown and described.

What is claimed is:—

1. The combination with a relatively stationary printing cylinder having a planographic printing surface, of a controller, means for shifting the position of the controller, means for supporting an inking mechanism, means for supporting a damping mechanism, mechanical connections between the controller and both said supporting means, whereby the movement of the controller causes both mechanisms to move into contact with the cylinder with the damping mechanism ahead of the inking mechanism and both mechanisms to move out of contact with the cylinder with the inking mechanism ahead of the damping mechanism.

2. The combination with a relatively stationary printing cylinder having a planographic printing surface, of a controller, means for shifting the position of the controller, brackets for supporting sets of inking and damping rolls, mechanical connections between the controller and the brackets, whereby the movement of the controller causes both sets of rolls to move into contact with the printing cylinder with the damping rolls ahead of the inking rolls and both sets to move out of contact with the cylinder with the inking rolls ahead of the damping rolls.

3. The combination with a printing cylinder having a planographic printing surface, of a controller provided with operating cams, means for shifting the position of the controller, brackets for supporting sets of inking and damping rolls, and operating connections between the cam surfaces and the brackets whereby the movement of the controller causes both sets of rolls to move into contact with the printing cylinder with the damping rolls ahead of the inking rolls and both sets to move out of contact with the cylinder with the inking rolls ahead of the damping rolls.

4. The combination with a relatively stationary printing cylinder having a planographic printing surface, of a pivoted controller, means for shifting the position of the controller, brackets for supporting sets of inking and damping rolls, and operating connections between the controller and the brackets whereby the movement of the controller causes both sets of rolls to move into contact with the printing cylinder with the damping rolls ahead of the inking rolls and both sets to move out of contact with the cylinder with the inking rolls ahead of the damping rolls.

5. The combination with a relatively stationary printing cylinder having a planographic printing surface, of a controller, means for shifting the position of the controller, means for supporting an inking mechanism, means for supporting a damping mechanism, connections between the controller and said mechanisms whereby the movement of the controller causes both mechanisms to move into contact with the printing cylinder with the damping mechanism ahead of the inking mechanism and both mechanisms to move out of contact with the printing cylinder with the inking mechanism ahead of the damping mechanism, and means whereby a movement of the damping mechanism may be effected independently of the controller.

6. The combination with a printing cylinder having a planographic printing surface, of pivoted brackets carrying inking and damping rolls, extensions from the brackets, a controller having cam surfaces arranged to produce a movement of the brackets, so that the inking and damping rolls shall move into contact with the cylinder with the damping rolls ahead of the inking rolls and shall move out of contact with the cylinder with the inking rolls ahead of the damping rolls, and means for moving the controller.

7. The combination with a printing cylinder having a planographic printing surface, of pivoted brackets carrying inking and damping rolls, extensions from the brackets, a controller having cam surfaces arranged to produce a movement of the brackets, so that the inking and damping rolls shall move into contact with the cylinder with the damping rolls ahead of the inking rolls and shall move out of contact with the cylinder with the inking rolls ahead of the damping rolls, means for moving the controller, and means for permitting a movement of the damping rolls independently of the controller.

8. The combination with a printing cylinder having a planographic printing surface, of a rocking cam plate mounted on the shaft of the cylinder, pivoted brackets carrying inking and damping rolls, extensions from the brackets to the cam plate, the cams on the plate being arranged to rock the brackets and move the inking and damping rolls into contact with the cylinder with the damping rolls ahead of the inking rolls and out of contact with the cylinder with the inking rolls ahead of the damping rolls, and means for rocking the cam plate.

9. The combination with a relatively stationary printing cylinder having a planographic printing surface, of inking and damping mechanisms, a movable controller, manually operated actuating devices for the controller, connections whereby the controller moves the inking and damping mechanisms into contact with the cylinder with the damping mechanism ahead of the inking mechanism and out of contact with the cylinder with the inking mechanism ahead of the damping mechanism, and means for locking the controller with said mechanisms either in or out of contact with the cylinder and also in a position intermediate the two with the damping mechanism in contact with the cylinder.

10. The combination with a relatively stationary printing cylinder having a planographic printing surface, of inking and damping mechanisms, a swinging controller, connections between the controller and said mechanisms whereby the movement of the controller moves said mechanisms into contact with the cylinder with the damping mechanism ahead of the inking mechanism and out of contact with the cylinder with the inking mechanism ahead of the damping mechanism, said connections being constructed to lock the controller with said mechanisms in their out position, manually operated actuating devices for the controller constructed to lock it with the inking and damping mechanisms in their in position, and a lock for holding the controller in intermediate position with the damping mechanism alone in contact with the cylinder.

11. The combination with a printing cylinder having a planographic printing surface, of inking and damping mechanisms, a pivoted controller provided with cam surfaces, connections including studs coöperating with the cam surfaces, whereby said surfaces cause the inking and damping mechanisms to move into and out of contact with the cylinder, the studs and cams being so arranged that the controller is locked with the inking and damping mechanisms in their out position, an operating crank, and a pivoted link between the controller and the crank, said link and crank being arranged to pass into line when the controller has moved said mechanisms into their in position and thus lock the mechanisms in such position.

12. The combination with a printing cylinder having a planographic printing surface, of inking and damping mechanisms, a pivoted controller provided with cam surfaces, connections including studs coöperating with the cam surfaces, whereby said surfaces cause the inking and damping mechanisms to move into and out of contact with the cylinder, the studs and cams being so arranged that the controller is locked with the inking and damping mechanisms in their out position, an operating crank, a pivoted link between the controller and the crank, said link and crank being arranged to pass into line when the controller has moved said mechanisms into their in position and thus lock the mechanisms in such position, and a lock for the crank arranged to hold the crank in an intermediate position with the damping mechanism in contact with the cylinder.

In testimony whereof, I have hereunto set my hand, in the presence of two subscribing witnesses.

WILLIAM J. MAIN.

Witnesses:
  WM. F. MORGAN,
  H. CRACKER.